April 25, 1967 W. FISCHER 3,316,541

MAGNETIC CORE MEMORY DEVICE

Filed June 30, 1959 2 Sheets-Sheet 1

INVENTOR
Walter Fischer

BY Connolly and Hutz
ATTORNEYS

April 25, 1967 W. FISCHER 3,316,541

MAGNETIC CORE MEMORY DEVICE

Filed June 30, 1959 2 Sheets-Sheet 2

INVENTOR
Walter Fischer
BY Connolly and Hutz
ATTORNEYS

United States Patent Office 3,316,541
Patented Apr. 25, 1967

3,316,541

MAGNETIC CORE MEMORY DEVICE

Walter Fischer, Silver Spring Md., assignor to Sprague Electric Company, North Adams, Mass., a corporation of Massachusetts Filed June 30, 1959, Ser. No. 823,875
2 Claims. (Cl. 340—174)

The invention relates to a magnetic core memory device with closed magnetizable cores as memory cells.

It is known in the art to use ring cores of ferrite material with a rectangular hysteresis loop for magnetic core memory devices. The storing procedure according to FIGURE 1 consists of conducting a current I through a core with constant cross section 10. This current causes the magnetic field strength $H_1$ which is necessary to magnetize the core to its saturation induction $B_1$. A current of the magnitude $I=\oint H ds$ is needed, where the integration path $s$ has to be taken once around the ring.

At ring cores with constant cross section, H equals $H_1$ ($H=H_1$). If the magnetization is reversed, a change in flux follows which induces a voltage $$u=\frac{d\phi}{dt}$$

($\phi$=magnetic flux through ring core) in reading wire 11. Wire 11 also runs through the ring core. This reading voltage has to have a minimum magnitude. For this magnitude only the cross section of the core is the determining factor at a certain saturation induction and a certain velocity of the magnetization reversion. The length of the iron path, however, can be selected.

In transistorized memories, small currents are desirable. Therefore, attempts have been made to keep the integral shown above small by making the diameter of the ring core as small as possible. This shortens the iron path and, therefore, the integration path.

It is an object of this invention to provide a magnetic core that is superior to the cores of the prior art.

It is another object of this invention to provide a magnetic core memory device that is superior to the memory devices of the prior art.

These and other objects of this invention will become apparent from this specification when read in conjunction with the accompanying drawings, in which.

In general, the objects of this invention are attained by a magnetic core memory with closed magnetizable cores as memory cells. The material of the cores and the shape of the cores is so selected that the current flowing in the memory cell induces a magnetic field strength in the memory cell which is smaller for the larger part of its path than for the shorter part of its path. The core material exhibits a rectangular hysteresis loop for the shorter part of the path. Specifically, the cross section of the rings is larger for the greater part of their circumference than for the remaining part.

The invention is based on the consideration that the value of the integral can also be reduced by making the field strength H, over the largest part of the integration path, very small. Only on a short stretch, the value $H_1$, necessary for saturation, is reached over the total cross section.

The magnetic core memory with closed magnetizable cores as memory cells is, therefore, according to the invention, characterized by the fact that the material of the cores and the shape of the cores is so selected as to enable the memory current flowing through a memory cell to induce a magnetic field strength which is smaller for the larger part of its path than for the smaller part of its path and that the core material exhibits a rectangular hysteresis loop for the smaller part of the path.

Figure 1:
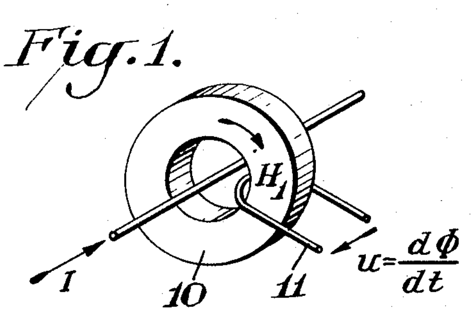
FIGURE 1 shows the storing and switching procedure for a ring core.
Figure 2:
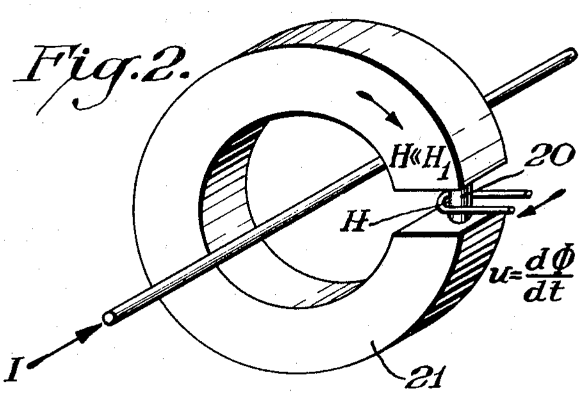
FIGURE 2 shows a core constructed in accordance with this invention.

In one form of the invention, a memory core is designed according to FIGURE 2 as a thin pin 20 with a solid magnetic back loop 21. Only pin 20 is used as memory cell. It consists of a rectangular ferrite and has the same cross section as a corresponding ring core. For the magnetic back loop 21, a material of high initial permeability is best suited. It should have as little magnetic resistance as possible against flux changes at switching of magnetization. A ferrite material as used for inductance coil cores can be employed.

Figure 3:
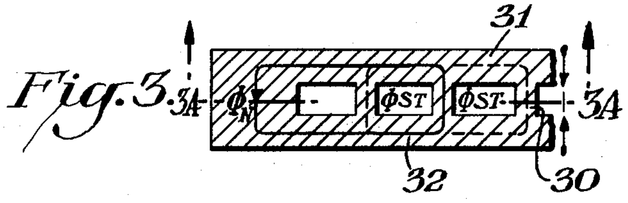
FIGURE 3 is a cross-sectional view taken on lines 3—3 of FIGURE 3A showing a coincidence memory matrix utilizing the cores of this invention.
Figure 3A:
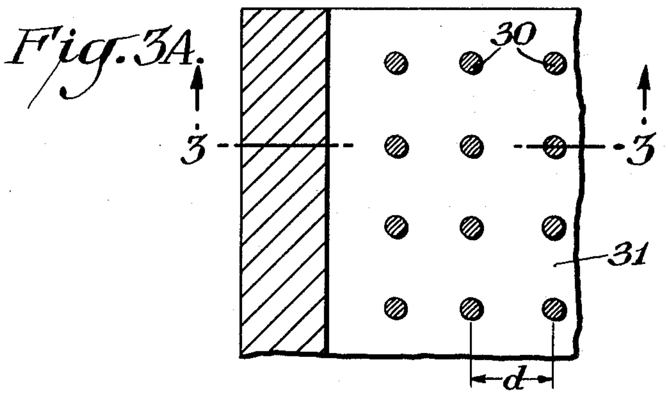
FIGURE 3A is a sectional view partially in elevation taken along lines 3A—3A of FIGURE 3 showing the embodiment of FIGURE 3.

This design might be unwieldly as a ring core. According to the invention, one changes then to another form of memory matrix as shown in FIGURES 3 and 3A. The pins 30 are here inserted between two ferrite plates 31, 32 at regular intervals. The plates are connected at the edges and serve as common magnetic back loop for all memory cells. The winding is put between the plates and is wound around the pins. The length of the pins depends on the space necessary for the winding. If one considers a length of 1 mm., a magnetizing current of approximately one fourth is sufficient compared to that of the core rings used till now (average circumference approximately 4 mm.).

The interference voltages which are caused by the controlling of the cores by pulse (half-) currents at a magnetic core memory according to the invention, could be expected to be of the same order of magnitude as for a ring core matrix. In addition to that, there is an interference introduced by the coupling over the common back loop. The cross section of the back loop increases considerably after the transition from pin to cover plates, however, that part of the flux, surrounding immediately adjoining pins can be kept negligibly small. A pin distance of a few multiples of the pin diameter suffices.

The distance of the pins is furthermore determined by the winding between them. It is possible to make it approximately half as large as the distance of the rings of the ring core memory. The matrices become correspondingly smaller.

Figure 4:
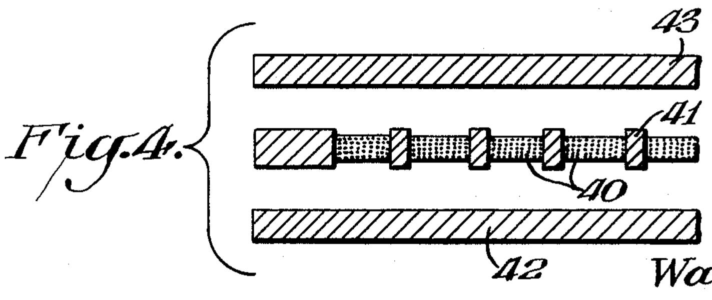
FIGURE 4 is an exploded sectional view showing a modification of FIGURE 3 in which the pins and the wiring are pressed together to form a plate.

For technological reasons, it is not possible to make the cover plates and pins out of one piece. They have to be made of, at least, two parts, even if they consist of the same material. They can be made e.g. by putting the pins solidly on one plate and by grinding their free ends and the opposite plate level. The two parts are then assembled after the winding has been inserted. Another possibility is the assembly of the winding 40 with the pins 41 as a plate, which is inserted between the cover plates 42, 43 according to FIGURE 4 after grinding the surfaces of contact level.

Figure 5:
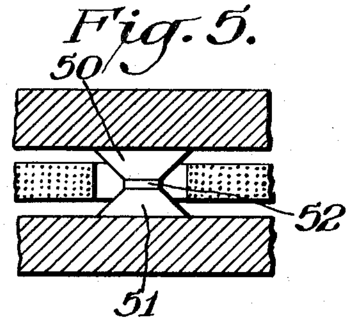
FIGURES 5 and 6 are sectional views showing variations in controlling the influence of the air gap.

The magnetic circuit is interrupted in any case by an air gap. The hysteresis curve is cut off by this air gap and its rectangular shape is flattened. The usability of this memory design is, therefore, dependent on the requirement that the air gap can be kept sufficiently small for all pins at the assembly of the parts. To obtain a rectangular shape of sufficient quality, the ratio of air gap to pin length should be below approximately $10^{-4}$. The influence of the remaining air gap can still be diminished by designing the transition from pin to cover plate with as large a surface as possible. It is e.g. possible to increase the ends 50, 51 of the pin conically, as shown in FIGURE 5.

Figure 6:
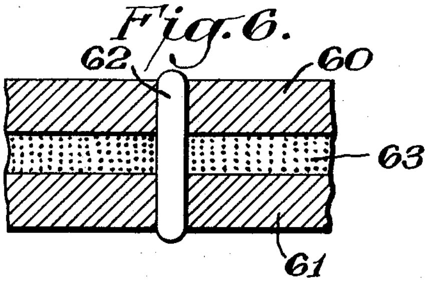

According to FIGURE 6, the pin may also be pushed in a drill hole 62 through both cover plates 60, 61 and the winding 63 and may eventually be fastened by screwing. This latter form also has the advantage that the individual cores may be exchanged.

The winding of the matrices can be done in the form of printed circuits. This will considerably decrease production costs compared with hand assembled ring core matrices. Besides this, it is possible to put several turns around one core. This results in an additional decrease in magnetizing currents and the reading signals increase while the same pin cross sections are used.

Figure 7:
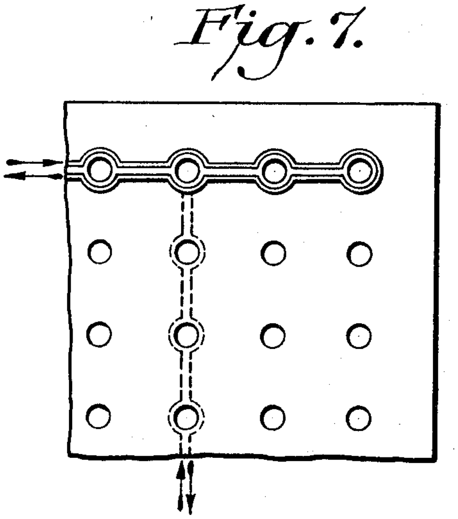
FIGURES 7 and 8 show two embodiments of printed circuit wiring patterns.
Figure 8:
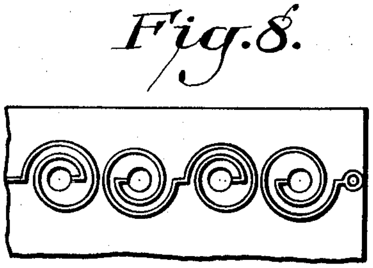

In FIGURE 7 and FIGURE 8, two samples of possible winding are shown. If the circuit is printed on a plate of insulation material, two plates containing two wiring planes each, are generally sufficient. The insulation plates are made very thin or, after the wire crossings have been treated with insulation lacquer, are left out completely.

This invention has been described above in embodiments which have been set forth for the purpose of illustration. Obviously many modifications and variations of the present invention are possible in the light of the above teachings. It is, therefore, to be understood that within the scope of the appended claims the invention may be practiced otherwise than as specifically described.

What is claimed is:

1. In a magnetic core memory matrix, closed magnetizable cores as memory cells, said cores having small dimensions and so constructed and arranged as to enable a memory current flowing through a memory cell to induce a magnetic field strength which is smaller for the larger part of its path than for the smaller part of its path, said cores comprising a plurality of substantially parallel thin pins spaced between a pair of rectangular plates in an array, said pins being in the order of magnitude of 1 mm. in length and of lesser diameter and spaced apart at a distance greater than the pin diameter and of the order of a few multiples of the pin diameter, said pins being of rectangular hysteresis material, said plates being of high permeability material and providing a common back loop for the magnetic fluxes through said plurality of pins in said array and an air gap of less than one-ten thousandth of the pin length.

2. A magnetic core memory device according to claim 1 in which windings are placed around the pins to form a plate-like assembly, said plate-like assembly of the windings and the pins being positioned between said pair of plates to position said pins in said array between said plates.

References Cited by the Examiner

UNITED STATES PATENTS

| | | | |
|---|---|---|---|
| 2,430,457 | 11/1947 | Dimond | 340—174 |
| 2,907,988 | 10/1959 | Duinker | 340—174 |

OTHER REFERENCES

Pages 4–22, 4–23, p4–0–164, p4–0–165, EDVAC Progress Report, No. 2, June 30, 1946.

BERNARD KONICK, *Primary Examiner.*

EVERETT R. REYNOLDS, JOHN F. BURNS, IRVING L. SRAGOW, *Examiners.*

J. J. POSTA, R. R. HUBBARD, J. W. MOFFITT, *Assistant Examiners.*